US012234622B1

(12) United States Patent
Evans (10) Patent No.: US 12,234,622 B1
(45) Date of Patent: Feb. 25, 2025

(54) HEAVY EQUIPMENT ATTACHMENT APPARATUS AND METHOD OF USE THEREOF

(71) Applicant: Vincent Evans, Clinton, MS (US)

(72) Inventor: Vincent Evans, Clinton, MS (US)

( * ) Notice: Subject to any disclaimer, the term of this patent is extended or adjusted under 35 U.S.C. 154(b) by 365 days.

(21) Appl. No.: 17/581,338

(22) Filed: Jan. 21, 2022

Related U.S. Application Data (60) Provisional application No. 63/139,954, filed on Jan. 21, 2021.

(51) Int. Cl.
*E02F 3/96* (2006.01)
*E01H 1/02* (2006.01)
*A01B 45/00* (2006.01)

(52) U.S. Cl.
CPC .............. *E02F 3/962* (2013.01); *E01H 1/02* (2013.01); *A01B 45/00* (2013.01)

(58) Field of Classification Search
CPC . E02F 3/962; E02F 3/963; E02F 3/404; E02F 3/7604; E01H 1/02; A01B 45/00
See application file for complete search history.

(56) References Cited

U.S. PATENT DOCUMENTS

| | | | | |
|---|---|---|---|---|
| 3,034,238 A * | 5/1962 | McGee | .................. | A01B 35/00 |
| | | | | 172/197 |
| 3,922,745 A | 12/1975 | Lehman | | |
| 4,512,090 A * | 4/1985 | Billings | .................. | E02F 3/815 |
| | | | | 37/405 |
| 4,895,476 A * | 1/1990 | Vangaever | ................ | E01H 1/02 |
| | | | | 404/112 |
| 5,515,625 A | 5/1996 | Keigley | | |
| 6,016,584 A * | 1/2000 | Melroe | .................... | E01H 1/056 |
| | | | | 15/82 |
| 6,655,469 B1 * | 12/2003 | Davis | ..................... | A01B 45/02 |
| | | | | 172/615 |
| 6,848,142 B2 * | 2/2005 | Truan | ..................... | B62D 49/04 |
| | | | | 37/468 |
| 7,654,591 B2 * | 2/2010 | Marble | .................... | B25G 1/06 |
| | | | | 294/51 |
| 9,422,682 B2 * | 8/2016 | Faught, Jr. | .............. | E01H 1/047 |
| 10,375,873 B2 * | 8/2019 | Campbell | .............. | A01B 63/22 |
| 11,486,106 B2 * | 11/2022 | Chaput | .................. | A46B 7/044 |
| 11,512,455 B2 * | 11/2022 | Prather, Jr. | ............ | E02F 3/7604 |

(Continued)

FOREIGN PATENT DOCUMENTS

SE         508207 C2 *  9/1998  ............... B09B 1/00

OTHER PUBLICATIONS

"5 in 1" box scraper; https://www.tractorbynet.com/forums/attachments/337209-5-1-box-scraper-grader.html; Jan. 30, 2020.

*Primary Examiner* — Adam J Behrens
*Assistant Examiner* — Blake E Scoville
(74) *Attorney, Agent, or Firm* — Garvey, Smith & Nehrbass, Patent Attorneys, L.L.C.; Julie Rabalais Chauvin; Vanessa M. D'Souza (57) ABSTRACT

The present invention relates to a heavy equipment or machinery attachment apparatus. More particularly, the present invention relates to a heavy equipment or machinery attachment apparatus that includes a broom, fixed rake tongues, and spring-loaded tongues, whereby tilting of the apparatus (and not detachment from a piece of heavy equipment or machinery) engages the broom or the rake component for use.

12 Claims, 6 Drawing Sheets

(56) References Cited

U.S. PATENT DOCUMENTS

| | | | |
|---|---|---|---|
| 2002/0104178 A1* | 8/2002 | Truan | B62D 49/04 |
| | | | 15/98 |
| 2005/0102778 A1 | 5/2005 | Gregerson | |
| 2007/0187964 A1* | 8/2007 | Marble | B25G 1/06 |
| | | | 294/51 |
| 2009/0211121 A1 | 8/2009 | Doster, Jr. et al. | |
| 2015/0354166 A1 | 12/2015 | Haveman | |
| 2021/0285188 A1* | 9/2021 | Prather, Jr. | E02F 3/962 |

* cited by examiner

HEAVY EQUIPMENT ATTACHMENT APPARATUS AND METHOD OF USE THEREOF

CROSS-REFERENCE TO RELATED APPLICATIONS

Priority is claimed to my U.S. Provisional Patent Application Ser. No. 63/139,954, filed 21 Jan. 2021, which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a heavy equipment or machinery attachment apparatus. More particularly, the present invention relates to a heavy equipment or machinery attachment apparatus that includes three components or elements: a broom, fixed rake tongues/tongs/teeth, and spring-loaded tongues/tongs/teeth.

2. General Background of the Invention

Currently, if a user using heavy equipment or machinery encounters different surfaces while a job is underway, different attachments have to be swapped out based on the surface the equipment encounters. An attachment has to be disconnected and then a new attachment has to be connected. For instance, during a construction clean-up or clean-up of demolition, different surfaces have to be cleaned (for example, hard surfaces, then dirt surfaces, and then potentially grass surfaces). During construction clean-up of hard surfaces, such as concrete, asphalt, brick pavers, etc., typically, a broom attachment is used. After the clean-up of the hard surface is finished, then a dirt surface may have to be cleaned, and the broom attachment has to be changed to a harrow or hard rake attachment. In order to do that, the broom attachment has to be removed, and the harrow or hard rake attachment has to be attached. After the dirt surface is cleaned, then, a grass surface may have to be cleaned, and the harrow or hard rake attachment has to be changed to a spring-loaded rake or dethatcher attachment. The harrow or hard rake attachment has to be removed, and a spring-loaded rake or dethatcher attachment has to be attached. If a loose rock surface, such as gravel, limestone, etc., needs to be cleaned, the attachment again has to be changed to a box blade scraper, levels, or leveling rake to clean said surface. The swapping out of different attachments slows down the construction project because everything has to come to a halt each time one attachment has to be disconnected and a new attachment has to be connected or attached to the piece of heavy machinery or equipment.

The present invention includes a single apparatus that can be attached to a heavy piece of equipment or machinery, wherein the apparatus includes three different surfaces or components, such that various attachments do not have to be swapped out from a piece of construction equipment or heavy machinery. When the single apparatus attachment of the present invention is connected to a heavy piece of equipment or machinery, that piece of equipment can transition between various surfaces seamlessly and can continue to perform construction and maintenance related tasks without having to swap out attachments. In a preferred embodiment, the attachment apparatus of the present invention can just be rotated or tilted so that one of the components (e.g., broom, fixed rake, spring-loaded rake) is in contact with the ground, and the other components are not in contact with the ground. Then, the apparatus can be rotated or tilted a different direction to engage a different component or extension with the ground surface. Specifically, the apparatus of the present invention can clean or be in contact with all different types of ground surfaces without having to disconnect one attachment, then connect another attachment, then disconnect the second attachment, and connect a subsequent attachment, etc.

The following U.S. Patents and U.S. Patent Application Publications are incorporated herein by reference: U.S. Pat. Nos. 3,922,745; 4,512,090; 5,515,625; 6,016,584; 2005/0102778; 2009/0211121; and 2015/0354166.

BRIEF SUMMARY OF THE INVENTION

The present invention relates to a heavy equipment or machinery attachment apparatus. More particularly, the present invention relates to a heavy equipment or machinery attachment apparatus that includes three components, elements, or extensions: a broom, a fixed rake component, and a spring-loaded tongues component.

The apparatus of the present invention can be in contact with or clean hard surfaces, such as concrete, asphalt, brick pavers, etc . . . , without chipping, scraping, or scoring those surfaces. A preferred embodiment of the apparatus of the present invention can also be in contact with or clean dirt surfaces, separating trash and debris, while leaving the dirt pulverized and prepared for seeding or sodding. A preferred embodiment of the apparatus of the present invention can also be in contact with or clean grass surfaces while leaving the lawn intact. A preferred embodiment of the apparatus of the present invention can also be used on loose rock surfaces (such as gravel, limestone, etc . . . ) while leaving rocks intact. A preferred embodiment of the apparatus of the present invention can be used with a piece of heavy equipment or machinery on all of these surfaces (and others) with one attachment apparatus, eliminating the need to purchase, rent or switch multiple attachments.

In various preferred embodiments of the present invention, the attachment apparatus is meant to assist with manual cleaning and is designed to preferably be used with a skid-steer or front-end loader or with any heavy equipment that has a grapple or thumb attachment.

In various preferred embodiments of the present invention, the attachment apparatus is geared towards cleaning multiple surfaces without changing attachments. For example, preferred embodiments of the present invention can clean surfaces, such as, but not limited to, asphalt, concrete, concrete gutters and curbs, dirt, lawns, sand and rock. Preferred embodiments of the present invention can clean trash, construction debris, dirt, leaves, bricks, and the like from various surfaces.

In various preferred embodiments, the attachment apparatus of the present invention can be used to sweep debris from flat surfaces, such as, but not limited to, asphalt, concrete, and concrete curbs and gutters.

In various preferred embodiments of the present invention, the attachment apparatus can be operated in conjunction with a grapple bucket, split bucket or thumb attachment on an excavator bucket. In this configuration, the attachment apparatus can be used to pile up debris on multiple surfaces, such as, but not limited to, those mentioned above, for easy pick up and loading with a grapple bucket, split bucket, or thumb attachment. In various alternative preferred embodiments of the present invention, the attachment apparatus can be operated as a single attachment, not used in conjunction with another attachment, using a quick connect front-end bucket attachment system. A preferred way of connecting the quick connect front-end bucket attachment system to the attachment apparatus of the present invention includes lifting a handle, attaching the attachment apparatus, and then lowering the handle to secure the attachment apparatus. In a preferred embodiment, the attachment apparatus includes a metal plate on one side with a ridge that facilitates the connection to the piece of heavy equipment. In a preferred embodiment, the metal plate preferably has a ridge on one end and a slot on the other end, with the slot preferably at the bottom of the metal plate. In a preferred embodiment of the present invention, the means of connection between the attachment apparatus and the piece of heavy machinery can be mirrored or identical. This can allow for the use of the present invention in any direction, and it will be just as efficient. For example, a user can use the apparatus of the present invention to get all the way to corners of fixed surfaces, such as a wall or building, and can use the rake or broom attachment, for example. In a preferred alternative embodiment of the present invention, there is an offset way of attaching the attachment means to the piece of machinery so that it can operate closer to or on top of a surface, such as curb, for example, or next to a wall without bumping the surface with wheels or tracks.

In various preferred embodiments of the present invention, the construction equipment attachment apparatus can remove trash, such as cleaning up a construction site, from dirt surfaces separating trash from the soil, leaving the soil pulverized, and the ground prepped for seed or sod beds.

In various preferred embodiments of the present invention, the attachment apparatus can clean or be used on grass areas, removing sticks, leaves, paper and the like without damaging lawns.

In various preferred embodiments of the present invention, the attachment apparatus can clean or be used on rock, gravel, limestone, and other surfaces. The attachment apparatus of the present invention can be used on roads and parking lots and can facilitate the removal of leaves, sticks, paper, and the like while leaving existing grade intact.

In various preferred embodiments of the present invention, the attachment apparatus can pull debris out of a lawn, dirt, or a rock area and off solid surfaces such as concrete or asphalt.

An example of a method of using a preferred embodiment of the present invention includes using a grapple bucket, split bucket, or excavator thumb to grab the attachment apparatus of the present invention and use it to pile debris. In order to do so, the user or operator of the piece of machinery can then lower the attachment apparatus of the present invention and load debris with the grapple bucket, split bucket, or excavator thumb. The user or operator can also use the quick connect attachment system to connect directly to the attachment apparatus of the present invention to begin piling debris. The user or operator can then disconnect the attachment apparatus from the loader or other piece of heavy equipment and then connect to a grapple bucket, split bucket or another loading attachment to complete loading the debris. In a preferred embodiment of the present invention, the piece of machinery does the loading. Specifically, the grapple bucket, split bucket and excavator thumb do the loading. Then, once attached to the piece of machinery, the apparatus of the present invention separates and piles debris.

In various preferred embodiments of the present invention, the attachment apparatus can be used for construction and demolition clean up. For example, the present invention can clean or be used on multiple surfaces at construction sites. These can include hard surfaces, such as concrete, asphalt, pavers, retainer walls and the like without chipping, scraping, or scoring surfaces. Various preferred embodiments of the present invention can also be used on dirt surfaces and can separate trash and debris while leaving dirt pulverized and prepared for seeding and sodding. The use of the apparatus of the present invention can eliminate the need for expensive hauling and replacement of contaminated soil. The present invention can also be used on grass surfaces without damaging existing lawns. The present invention can also be used on rock surfaces and can leave rocks intact. In various preferred embodiments of the present invention, all three components or elements of the attachment apparatus can be used to clean and can be used in conjunction with many different surfaces. Hard surfaces, such as (but not limited to) concrete, asphalt, pavers etc . . . can be cleaned with the broom component or attachment of the present invention. Dirt surfaces can be cleaned with the fixed rake component or spring-loaded tongues component or a combination of the two components of the present invention depending on the condition of the soil and density of the trash. For instance, if the soil is loose and the trash is light (paper, glass, sticks etc . . . ), the component of the apparatus of the present invention that includes spring-loaded extensions can be used. If the soil is loose, but trash is heavy (bricks, wood etc . . . ) then a combination of the fixed and spring-loaded extensions of the apparatus of the present invention can be used. Grass surfaces can be cleaned with the component or element of the present invention that includes spring-loaded extensions, and because of their flexibility, they will not damage lawns. The component or element of the present invention that includes spring-loaded extensions can be used on loose rock surfaces. And, because of the flexibility of the spring-loaded extensions, they will leave the rocks intact while pulling out debris.

In various preferred embodiments of the present invention, the attachment apparatus can be used for landscaping. For example, the present invention can level, de-weed, and prepare the ground or soil for seed and sod beds. The attachment apparatus of the present invention can also be used as a de-thatcher to remove dead matted grass from soil surfaces, leaving existing lawns aerated and intact. The present invention can also remove leaves, sticks, and the like from hard surfaces, rock surfaces, and lawns while leaving lawns intact. Various preferred embodiments of the present invention can be used as a harrow rake as well as a drag mat in restoring, de-wedding, leveling and fluffing in-fields of baseball fields and volley ball courts, for example. The rake component of the attachment apparatus of the present invention is preferably used for de-weeding. A combination of fixed tongue extensions and spring-loaded tongue extensions of the present invention can also be used.

In various preferred embodiments of the present invention, the attachment apparatus can be used on a livestock farm in various ways. For example, the attachment apparatus of the present invention can sweep concrete floors in barns using the broom attachment with minimum dust and noise, which is beneficial to livestock and farm animals. The present invention can also be used as a harrow rake to aerate and de-thatch lawns in pastures and disperse manure, which can help to cultivate a uniform organically fertilized lawn for grazing livestock. The present invention can also be used as a snow plow to remove snow from hard surfaces, such as asphalt, brick pavers, concrete and concrete curbs and gutters. The present invention can also be used for clean-up and maintenance of debris from a variety of surfaces including concrete, asphalt, rock, sand, and lawn areas and can do this without damaging those surfaces.

In various preferred embodiments of the present invention, the attachment apparatus can operate without hydraulic fluids or grease to propel or lubricate, which helps to eliminate petroleum waste and be environmentally friendly.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
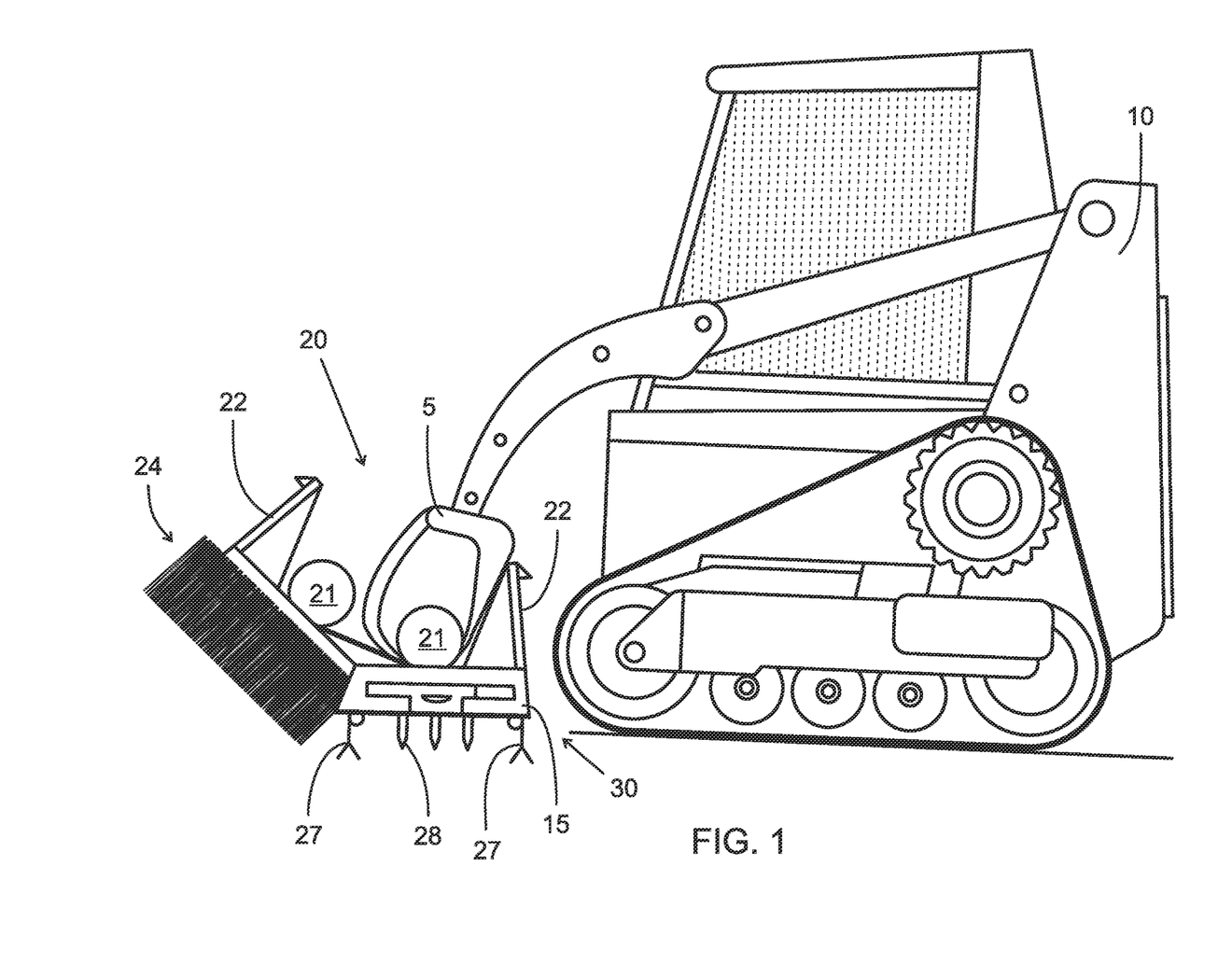
FIG. 1 shows a preferred embodiment of the apparatus of the present invention used with a grapple bucket attachment of a piece of heavy equipment or machinery.

FIG. 1 is a side view of a preferred embodiment of the present invention showing heavy piece of equipment or machinery 10 (which can be a Skid Steer loader, for example) with grapple bucket attachment 5 and the attachment apparatus of the present invention, designated generally by the numeral 20, attached to grapple bucket attachment 5. In a preferred embodiment, attachment apparatus of the present invention can be sized and shaped to mate with or attach to any size piece of heavy machinery or construction equipment.

Figure 4:
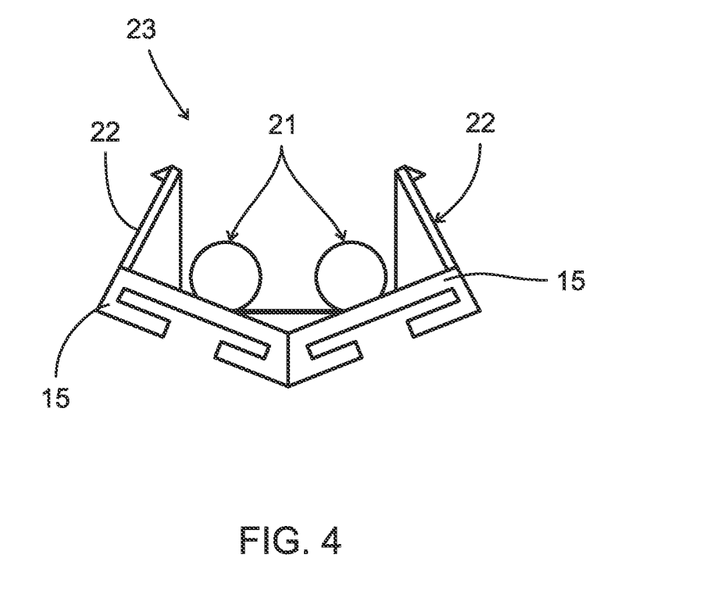
FIG. 4 shows a preferred embodiment of the apparatus of the present invention without the broom and rake attachments attached to the tray or frame.
Figure 7:
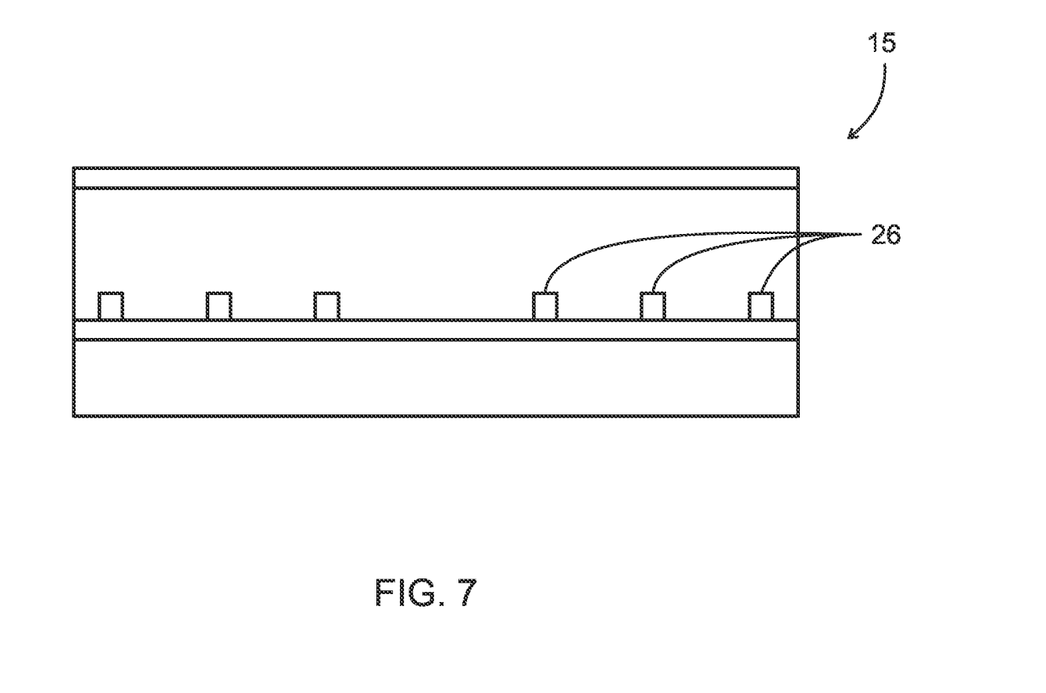
FIG. 7 shows a preferred embodiment of the tray of the apparatus of the present invention.

In a preferred embodiment, machinery attachment apparatus 20 of the present invention can include frame, as shown in FIG. 4. Frame or support structure 23 can include one or more attachment receiving components or trays 15. FIG. 4 shows a preferred embodiment of frame 23 that has two attachment receiving trays 15. Frame 23 can also include quick connect attachment plates 22 that are preferably attached at each end of frame 23. In a preferred embodiment, grapple bars 21 are preferably located between plates 22. Bars 21 are preferably generally parallel to each other. Attachment tray 15 can be generally C-shaped. As shown in FIG. 7, in a preferred embodiment tray 15 can include locking pin slots 26.

Figure 5:
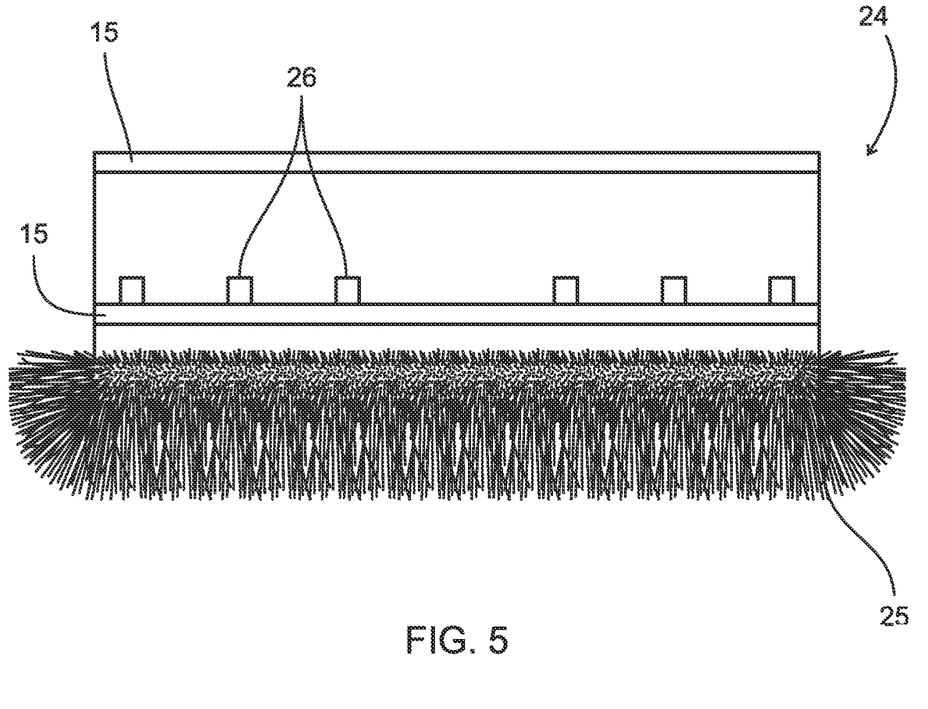
FIG. 5 shows a preferred embodiment of the broom attachment of the apparatus of the present invention.
Figure 6:
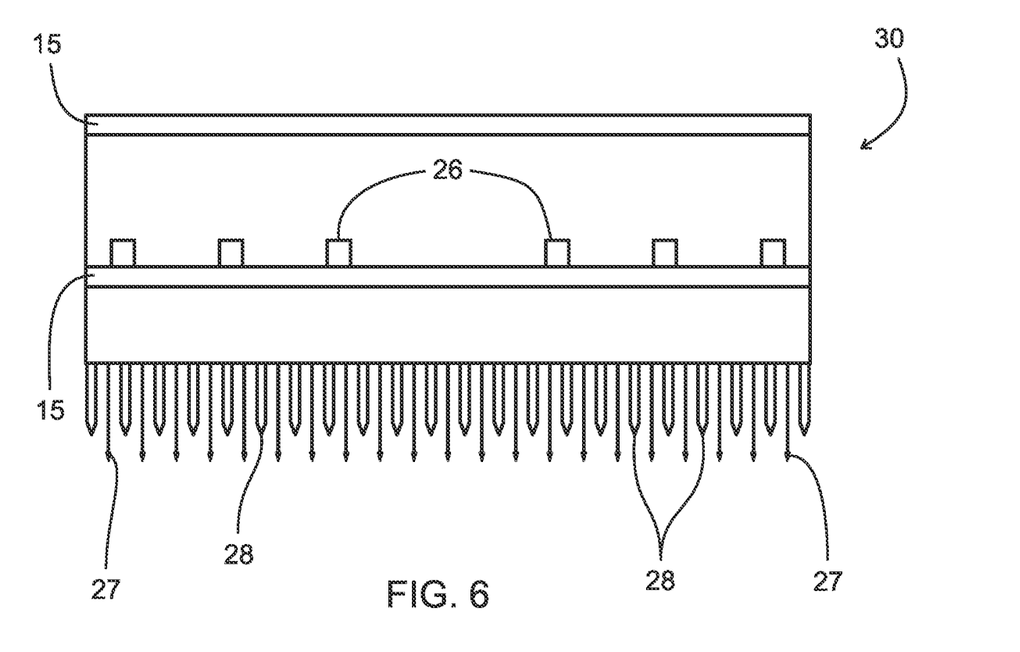
FIG. 6 shows a preferred embodiment of the rake attachment of the apparatus of the present invention.

Tray 15 of frame or structure 23 is preferably sized and shaped to accommodate a first component or construction equipment attachment tool 24, which is preferably a broom attachment (as shown in FIG. 5). Shell or tray 15 of structure 23 is also preferably sized and shaped to accommodate a second component or construction equipment attachment tool 30, which is preferably a rake attachment 30 (as shown in FIG. 6).

Second construction equipment tool 30 and first construction equipment tool 24 can preferably be attached to their respective tray 15 in the same manner. Broom attachment 24 can include its own locking pin or securing means 45. Rake attachment 30 can include its own locking pin or securing means 45 that can be similar to pin 45 for broom attachment 24.

In a preferred method of attaching attachments 24, 30 to frame 23 includes first removing pin or securing means 45 from attachment 24, 30; then, positioning attachment 24, 30 onto its own tray 15 using handle or grip 40. Then, each locking pin or securing means 45 is returned to its respective attachment 24, 30 by sliding pin 45 through slots 26 of each tray 15, returning pin 45 to the safety position, and securing each attachment 24, 30 to its own respective tray 15. Slots 26 are preferably sized and shaped to accommodate pin or rod 45.

In FIG. 1, broom attachment or component 24 and rake attachment or component 30 are each connected to/secured to a respective tray 15 of frame 23. Grapple bucket 5 can latch or grab onto grapple bar 21. FIG. 1 shows grapple bucket 5 secured to/grabbing onto grapple bar 21 and titling attachment apparatus 20 so that rake component 30 is in contact with the ground or surface and is ready for use. When rake attachment 30 is in contact with the ground, broom attachment 24 can be titled up so that it is not in contact with the ground (as shown in FIG. 1). If a user wants to use broom component 24 of the attachment apparatus 20 of the present invention, the user can tilt attachment apparatus 20 enabling the broom attachment 24 to be in contact with the ground or surface and ready for use. In a preferred embodiment, when broom attachment 24 is in contact with the ground or surface, rake attachment 30 can be tilted up so that it is not in contact with the ground. In FIG. 1, for example, a user could detach bucket 5 from grapple bar 21 that it is secured to and the have bucket 5 then grab onto or secured to the other bar 21 sitting atop broom component 24. Broom attachment would then be in contact with the ground or surface and would be ready for use, and rake component 30 would be tilting up and not in contact with the ground. Detachment or unlatching of the attachment apparatus 20 from the piece of machinery can occur, but preferably only occurs if a user or operator of the piece of machinery is switching directions.

Figure 2:
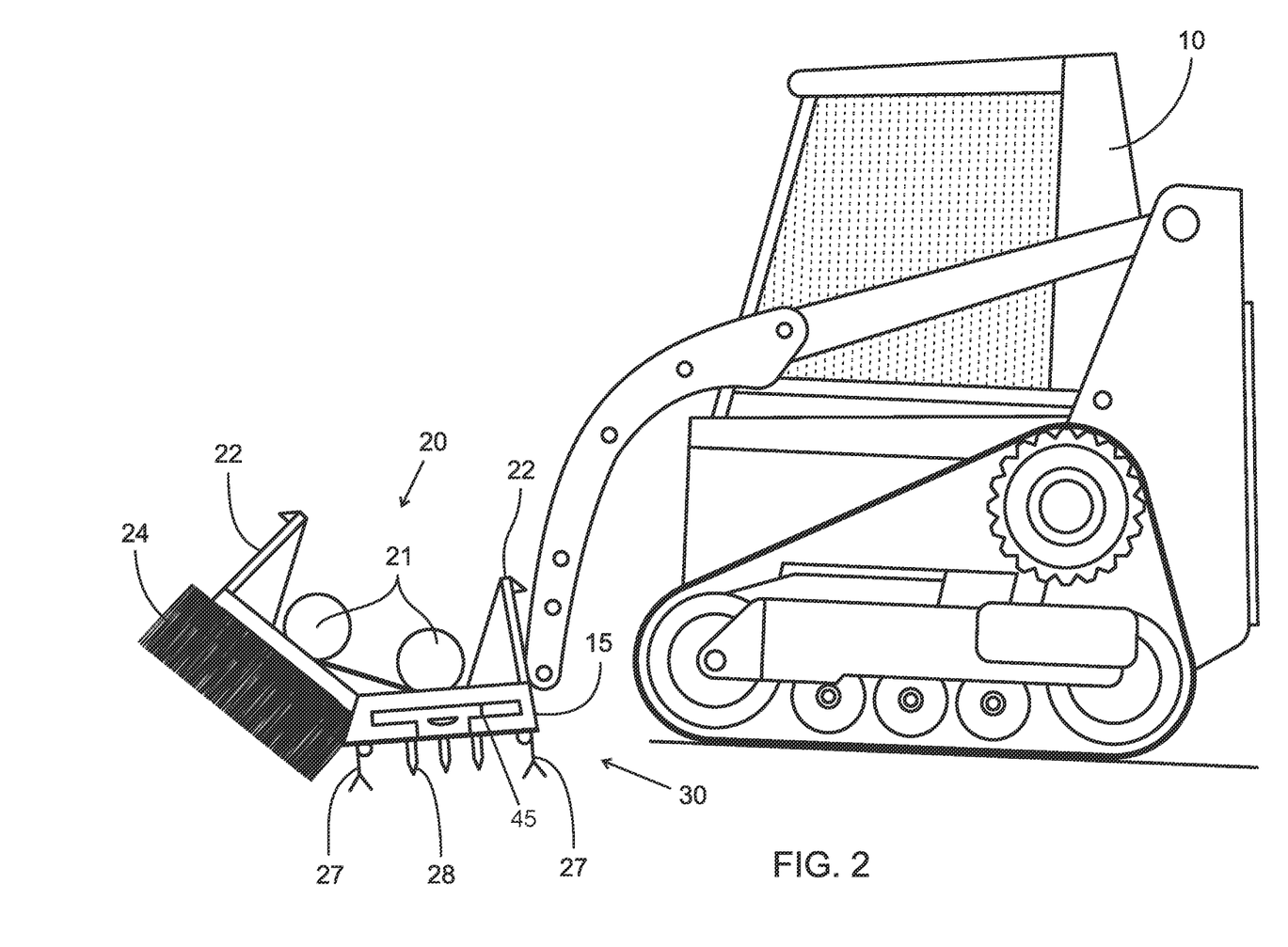
FIG. 2 shows an alternative preferred embodiment of the apparatus of the present invention used with a quick connect attachment system of a piece of heavy equipment or machinery.

FIG. 2 is an alternative preferred embodiment of the present invention showing a Skid Steer loader using the quick connect attachment system. FIG. 2 shows broom attachment 24 and rake attachment 30 each connected to a respective tray 15 of frame 23. FIG. 2 shows attachment apparatus 20 tilted so that rake attachment 30 is in contact with the ground and is ready to be used. In a preferred embodiment of the present invention, attachment apparatus 20 is designed so that when rake attachment 30 is in contact with the ground, broom attachment 24 is titled up so that it is not in contact with the ground. In this alternative preferred embodiment of the present invention, if a user wants to use the broom attachment 24 of the attachment apparatus 20 of the present invention, the user or operator of the piece of equipment 10 can tilt the attachment apparatus 20 enabling the broom attachment 24 to be in contact with the ground or surface and ready for use. In a preferred embodiment of the present invention, attachment apparatus 20 is designed so that when broom attachment 24 is in contact with the ground or surface, rake attachment 30 is tilted up so that it is not in contact with the ground.

Figure 3:
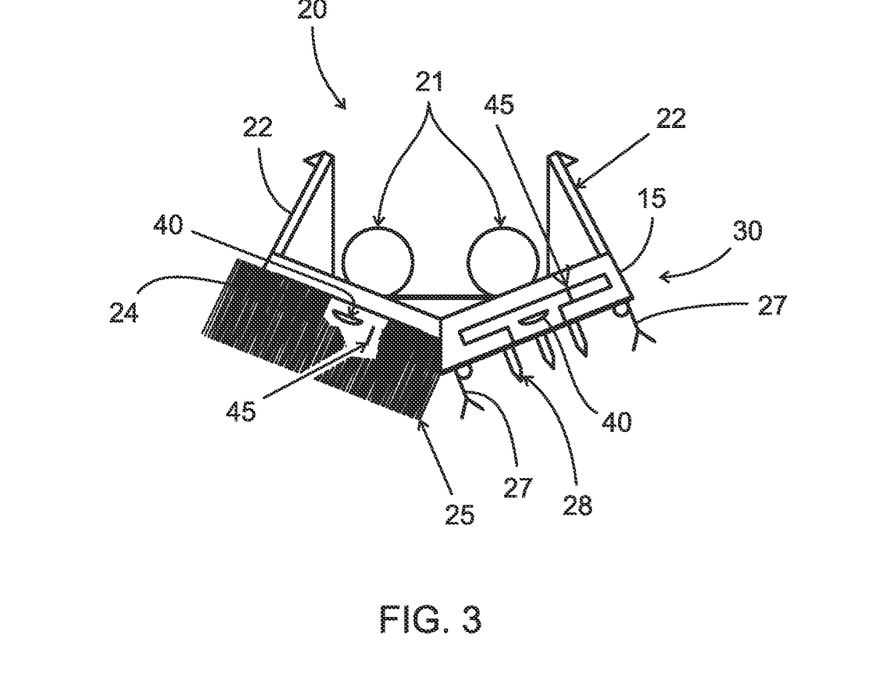
FIG. 3 shows a preferred embodiment of the apparatus of the present invention with the broom and rake attachments attached to the tray or frame.

FIG. 3 is a preferred embodiment of the apparatus of the present invention with the broom 24 and rake 30 attachments attached to the frame 23. In a preferred embodiment of the present invention, handle or grip 40 and pin 45, shown in FIG. 3, can secure broom attachment 24 to tray 15. A second handle 40 and pin 45 can secure rake attachment to tray 15 of frame 23. Handle 40 can be attached to broom attachment 24. Rake attachment 30 can also have handle 40 attached to it. In a preferred embodiment, handle 40 allows for the broom 24 or rake 30 trays to be easily removed from its respective tray 15 for repairs, replacement, and/or maintenance. In a preferred embodiment of the present invention, broom attachment 24 is attached to tray 15 that is not the same tray 15 that rake attachment 30 is attached to. Because of this, broom attachment 24 can be removed from its respective tray 15 while leaving rake attachment 30 intact/still attached to its respective tray 15. In a preferred embodiment, pin 45 can secure broom attachment 24 from coming out. Pin 45 can fit into slot 46 to preferably secure broom attachment 24. Pin 45 can also secure rake attachment 30 from coming out by sliding into slot 46.

Figure 9:
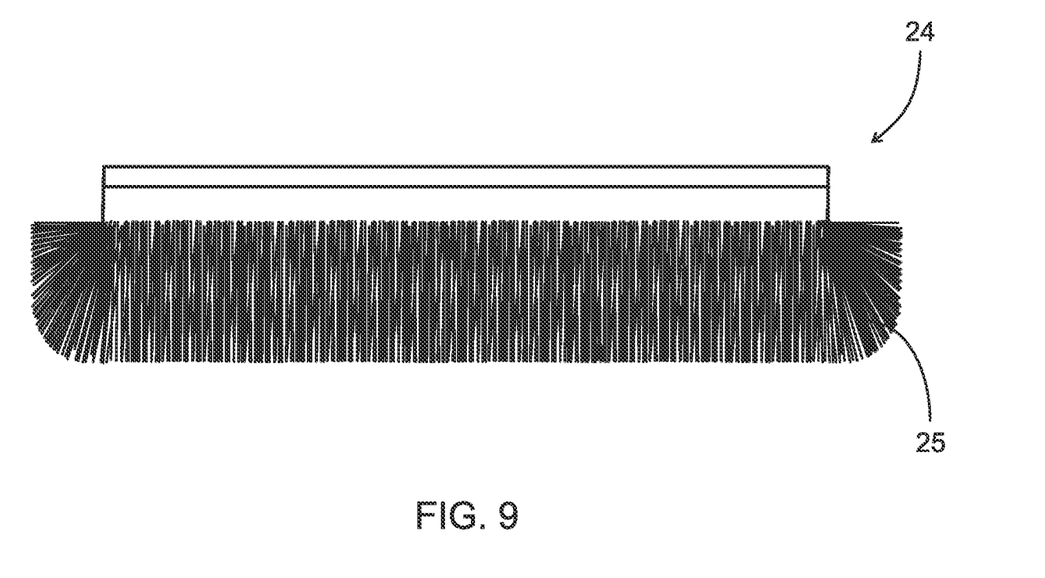
FIG. 9 shows a preferred embodiment of the broom attachment of the apparatus of the present invention.

FIGS. 5 and 9 show a preferred embodiment of broom attachment 24. FIG. 5 shows broom attachment 24 attached to tray 15 of support 23. FIG. 9 shows broom attachment 24 not attached to tray 15. Broom attachment 24 preferably includes broom bristles 25 that come into contact with the ground or surface when broom attachment 24 is in use.

Figure 8:
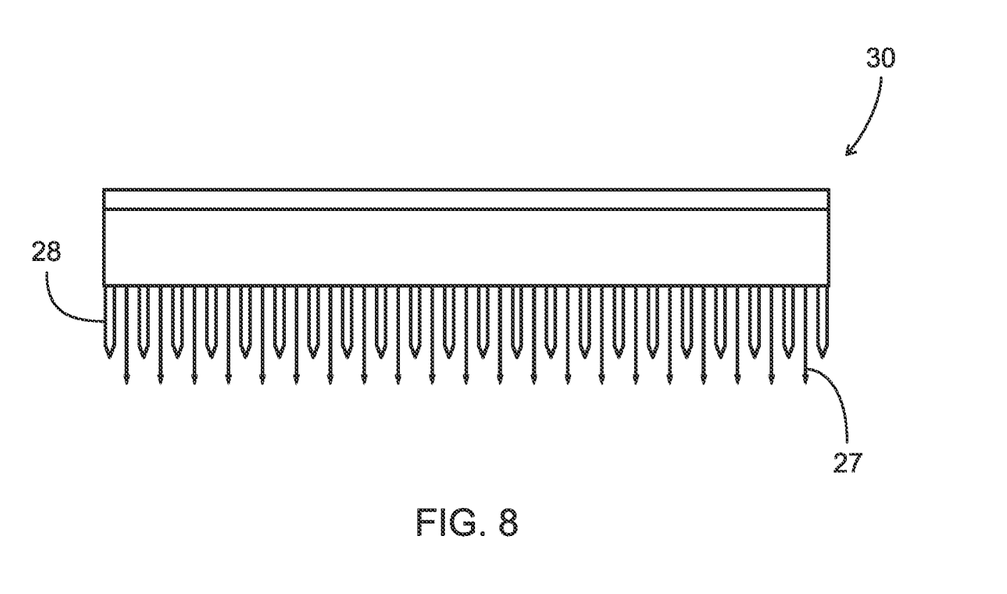
FIG. 8 shows a preferred embodiment of the rake attachment of the apparatus of the present invention.

FIGS. 6 and 8 show a preferred embodiment of rake attachment 30. FIG. 6 shows rake attachment 30 attached to its respective tray 15 of structure 23. FIG. 8 shows rake attachment 30 prior to its attachment to tray 15. Rake attachment 30 preferably includes extensions or appendages 27 that are preferably spring loaded rake tongues, and extensions or appendages 28 that are preferably fixed rake tongues or extensions. Spring loaded extensions 27 are preferably longer than fixed rake extensions 28. Extensions 27 and 28 can come into contact with the ground or surface when rake attachment 30 is in use.

In various preferred embodiments of the present invention, broom attachment 24 is preferably about 2-20 feet long, more preferably about 6-8 feet long, and most preferably about 6 feet 10 inches long. Broom attachment 24 can have different dimensions than those listed herein.

In various preferred embodiments of the present invention, rake attachment 30 is preferably about 2-20 feet long, more preferably about 6-8 feet long, and most preferably about 6 feet 6 inches feet long. Rake attachment 30 can have different dimensions than those listed herein.

In various preferred embodiments of the present invention, grapple bar 21 is preferably about 2-20 feet long, more preferably about 6-8 feet long, and most preferably about 6 feet 6 inches long. In various preferred embodiments of the present invention, grapple bar 21 preferably has a diameter of about 2-20 inches, more preferably about 5-8 inches, and most preferably about 6 inches. Grapple bar 21 can have different dimensions than those listed herein.

In various preferred embodiments of the present invention, quick connect attachment plate 22 is preferably about 2-20 feet long, more preferably about 6-8 feet long, and most preferably about 6 feet long. In various preferred embodiments of the present invention, quick connect attachment plate 22 is preferably about 1-2 feet in height, more preferably about 1'4"-1'10" in height, and most preferably about 1'6" high. Attachment plate 22 can have different dimensions than those listed herein.

PARTS LIST

The following is a list of parts and materials suitable for use in the present invention:

| Parts Number | Description |
| --- | --- |
| 5 | Grapple bucket of heavy piece of equipment or machinery 10 |
| 10 | Heavy piece of equipment or machinery (such as a front-end loader or skid steer) |
| 15 | Attachment receiving component/tray/shell of frame 23 |
| 20 | Machinery attachment apparatus |
| 21 | Grapple bars of frame 23 |
| 22 | Quick connect attachment plate of frame 23 |
| 23 | Frame/support/structure of attachment apparatus 20 |
| 24 | Broom attachment/component/tool of attachment apparatus 20 |
| 25 | Broom bristles of broom attachment 24 |
| 26 | Locking Pin Slot for the quick connect system |
| 27 | Extensions/fingers/appendages (preferably Spring loaded) of rake attachment 30 |
| 28 | Extensions/fingers/appendages (preferably Fixed rake) of rake attachment 30 |
| 30 | Rake attachment/component/tool of machinery attachment apparatus 20 |
| 40 | Handle/Grip |
| 45 | Pin/Securing means/Rod |
| 46 | Slot/hole |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A machinery attachment apparatus comprising:
a frame removably attached to a piece of heavy machinery or equipment,
a broom attachment attached to the frame, and
a rake attachment attached to the frame;
wherein the frame comprises:
two attachment receiving trays, wherein the first tray is sized and shaped to accommodate and fit the broom attachment, and the second tray is sized and shaped to accommodate and fit the rake attachment, wherein the trays abut each other,
an attachment plate connected to the first tray at a 90 degree angle, and a second attachment plate connected to the second tray at a 90 degree angle; and
at least two grapple bars located in between the attachment plates; wherein the machinery attachment apparatus is configured to enable engagement between the broom attachment and a ground or surface without engaging the rake attachment with the ground or surface while the broom attachment is in use; and wherein the machinery attachment apparatus is adjustable to enable engagement between the rake attachment and the ground or surface without engaging the broom attachment with the ground or surface while the rake attachment is in use.

2. The machinery attachment apparatus of claim 1, wherein the rake attachment has one or more spring loaded rake tongues.

3. The machinery attachment apparatus of claim 2, wherein the rake attachment has one or more fixed rake tongues.

4. The machinery attachment apparatus of claim 1, wherein the first tray includes at least two pin slots, and the broom attachment includes a pin, the broom attachment pin is inserted into the first tray pin slots to enable attachment of the broom attachment to the first tray.

5. The machinery attachment apparatus of claim 1, wherein the second tray includes at least two pin slots, and the rake attachment includes a pin, the rake attachment pin is inserted into the second tray pin slots to enable attachment of the rake attachment to the second tray.

6. The machinery attachment apparatus of claim 5, wherein the first tray includes at least two pin slots, and the broom attachment includes a pin, the broom attachment pin is inserted into the first tray pin slots to enable attachment of the broom attachment to the first tray.

7. The machinery attachment apparatus of claim 1, wherein the apparatus is attached to a grapple bucket on the piece of heavy machinery or equipment.

8. The machinery attachment apparatus of claim 7, wherein one of the grapple bars rests on the first tray attached to the broom attachment, and wherein another of the grapple bars rests on the second tray attached to the rake attachment.

9. The machinery attachment apparatus of claim 8, wherein the grapple bucket is secured to the first tray grapple bar to enable use of the broom attachment.

10. The machinery attachment apparatus of claim 8, wherein the grapple bucket is secured to the second tray grapple bar to enable use of the rake attachment.

11. The machinery attachment apparatus of claim 10, wherein
   adjustment between use of the rake attachment and the broom attachment occurs by tilting the frame to enable engagement between one of the attachments and the ground or surface.

12. The machinery apparatus of claim 1, wherein the apparatus is attached to an excavator thumb on the piece of heavy machinery or equipment.

\* \* \* \* \*